United States Patent
Herrmann et al.

(10) Patent No.: US 12,379,237 B2
(45) Date of Patent: Aug. 5, 2025

(54) METHOD FOR OPERATING AN ULTRASONIC FLUID METER FOR PRESSURE DETERMINATION USING A PIEZOCERAMIC ULTRASONIC TRANSDUCER, AND ULTRASONIC FLUID METER

(71) Applicant: Diehl Metering GmbH, Ansbach (DE)

(72) Inventors: Florian Herrmann, Dinkelsbühl (DE); Philip Wolf, Ansbach (DE)

(73) Assignee: Diehl Metering GmbH, Ansbach (DE)

( * ) Notice: Subject to any disclaimer, the term of this patent is extended or adjusted under 35 U.S.C. 154(b) by 287 days.

(21) Appl. No.: 17/973,979

(22) Filed: Oct. 26, 2022

(65) Prior Publication Data

US 2023/0147194 A1 May 11, 2023

(30) Foreign Application Priority Data

Nov. 9, 2021 (DE) ...................... 10 2021 129 099.6

(51) Int. Cl.
*G01F 1/667* (2022.01)
*G01L 9/08* (2006.01)
*G01L 9/12* (2006.01)
*G01M 3/28* (2006.01)

(52) U.S. Cl.
CPC ............... *G01F 1/667* (2013.01); *G01L 9/08* (2013.01); *G01L 9/12* (2013.01); *G01M 3/2807* (2013.01)

(58) Field of Classification Search
CPC .. G01F 1/667; G01L 9/08; G01L 9/12; G01M 3/2807

USPC ....................................................... 73/861.27

See application file for complete search history.

(56) References Cited

U.S. PATENT DOCUMENTS

| | | | |
|---|---|---|---|
| 9,970,799 B2 | 5/2018 | Nielsen et al. | |
| 10,830,625 B2 | 11/2020 | Skallebaek et al. | |
| 2007/0084298 A1* | 4/2007 | Rieder | G01F 1/8404 73/861.356 |
| 2008/0250870 A1* | 10/2008 | Rhodes | G01F 1/66 73/861.27 |
| 2016/0320219 A1* | 11/2016 | Hellevang | G01N 29/22 |
| 2020/0300679 A1 | 9/2020 | Kroemer | |

FOREIGN PATENT DOCUMENTS

| | | |
|---|---|---|
| DE | 102017011201 A1 | 6/2019 |
| DE | 102019006807 A1 | 4/2021 |
| EP | 3367074 A1 | 8/2018 |
| EP | 3158297 B1 | 9/2020 |
| JP | 2011043366 A | 3/2011 |

* cited by examiner

*Primary Examiner* — Peter J Macchiarolo
*Assistant Examiner* — Rodney T Frank
(74) *Attorney, Agent, or Firm* — Laurence A. Greenberg; Werner H. Stemer; Ralph E Locher

(57) ABSTRACT

A method for operating an ultrasonic fluid meter, preferably an ultrasonic water meter, in a fluid distribution network, includes using an ultrasonic transducer to generate an ultrasonic signal which passes through a measurement path, and determining a flow volume by using evaluation electronics on the basis of a transit time and/or a transit time difference of the ultrasonic signal. A hydraulic force change acting on the ultrasonic transducer through the fluid generates a voltage signal waveform on the ultrasonic transducer and the voltage signal waveform is tapped by the evaluation electronics. An ultrasonic fluid meter, preferably ultrasonic water meter, is also provided.

18 Claims, 4 Drawing Sheets

METHOD FOR OPERATING AN ULTRASONIC FLUID METER FOR PRESSURE DETERMINATION USING A PIEZOCERAMIC ULTRASONIC TRANSDUCER, AND ULTRASONIC FLUID METER

CROSS-REFERENCE TO RELATED APPLICATION

This application claims the priority, under 35 U.S.C. § 119, of German Patent Application DE 10 2021 129 099.6, filed Nov. 9, 2021; the prior application is herewith incorporated by reference in its entirety.

FIELD AND BACKGROUND OF THE INVENTION

The invention relates firstly to a method for operating an ultrasonic fluid meter, preferably an ultrasonic water meter, in a fluid distribution network, in which an ultrasonic transducer generates an ultrasonic signal which passes through a measurement path and the flow volume is determined by evaluation electronics on the basis of the transit time and/or a transit time difference of the ultrasonic signal. The invention relates secondly to an ultrasonic fluid meter, preferably an ultrasonic water meter, for installation in a fluid distribution network, including a measuring tube housing, at least one ultrasonic transducer for emitting and/or receiving an ultrasonic signal that travels along a measurement path, an electronic module which contains control and evaluation electronics for controlling the operation and for evaluating the received ultrasonic signal, and a battery.

Ultrasonic fluid meters are used to determine the flow rate of fluid in a fluid distribution network such as a water supply network. In a fluid distribution network the fluid is under pressure. A flow-rate measurement or fluid volumetric flow measurement is performed on the basis of a measurement of the transit time of an ultrasonic signal that is transmitted through the fluid. The transit time is measured once with and once against the flow direction. The fluid flow rate or fluid volumetric flow can be determined from the difference in the transit times. Ultrasonic fluid meters are commonly supplied with electrical energy from a battery. The battery capacity of such a battery is sufficient to cover the entire service life of the ultrasonic fluid meter in the field. The service life of an ultrasonic fluid meter is usually in a range from 12 to 16 years.

In addition to the flow rate measurement, the measurement of the pressure or pressure changes present in the fluid distribution network is of particular interest. For pressure measurement in fluid distribution networks, dedicated pressure measuring devices are usually installed in the fluid distribution network. Alternatively, fluid meters can be equipped with an additional, separate pressure gauge or pressure sensor. Thus, independent sensors are required for both pressure measurement and flow rate measurement. This significantly increases the production costs of the ultrasonic fluid meter.

DESCRIPTION OF THE RELATED ART

European Patent Application EP 3 367 074 A1, corresponding to U.S. Pat. No. 10,830,625, describes an electronic fluid flow meter, which includes two ultrasonic transducers. The ultrasonic transducers are positioned in such a way that they transmit ultrasonic signals through a first wall. The flow meter also includes a separate integrated pressure sensor which is disposed in a sensor bore. The pressure sensor includes a sensor housing in the form of a flexible diaphragm, which seals the sensor bore against the fluid. A sensor element detects diaphragm changes based on the fluid pressure and determines a pressure or a change in the pressure of the fluid. The sensor element can be based on inductive, capacitive, piezoelectric or strain-gauge based technologies.

European Patent EP 3 158 297 B1, corresponding to U.S. Pat. No. 9,970,799, describes an ultrasonic consumption meter for measuring the flow rate of a fluid, which includes two ultrasonic transducers on the outer surface of a flow pipe. The ultrasonic transducers are disposed in such a way that they transmit ultrasonic signals through a wall of the flow pipe. In addition, the ultrasonic consumption meter includes two strain gauges on the outer surface of the flow pipe, which generate a signal indicating the pressure of the fluid. The strain gauges are also disposed on the outer surface of the flow pipe and measure the strain on the flow pipe in response to the pressure of the fluid.

SUMMARY OF THE INVENTION

It is accordingly an object of the invention to provide a method for operating an ultrasonic fluid meter for pressure determination using a piezoceramic ultrasonic transducer, and an ultrasonic fluid meter, which overcome the hereinafore-mentioned disadvantages of the heretofore-known methods and meters of this general type and which enable a cost-effective and easily integrated measurement of the fluid pressure.

The above object is achieved by a method and an ultrasonic fluid meter according to the independent claims. Advantageous embodiments of the method according to the invention and the ultrasonic fluid meter are recited in the corresponding dependent claims.

With the foregoing and other objects in view there is provided, in accordance with the invention, a method for operating an ultrasonic fluid meter, preferably an ultrasonic water meter, in a fluid distribution network, in which an ultrasonic transducer generates an ultrasonic signal which passes through a measurement path and the flow volume is determined by evaluation electronics on the basis of the transit time and/or a transit time difference of the ultrasonic signal, and a hydraulic force change acting on the ultrasonic transducer, and thus on the piezoceramic, through the fluid generates a voltage signal waveform on the ultrasonic transducer. According to the invention, the voltage signal waveform is tapped by the evaluation electronics. The level waveform or the voltage of the voltage signal waveform depends on the strength and duration of the hydraulic force change acting on the ultrasonic transducer, i.e. on the pulse that acts on the ultrasonic transducer. The greater the change in hydraulic force, the greater the level waveform or the voltage, and vice versa. The level waveform or the voltage, i.e. the amplitude, of the voltage signal waveform and the hydraulic force change are therefore proportional to each other. This makes it possible to derive information about the fluid, in particular fluid pressure changes, or information about the fluid distribution network from the voltage signal waveform without the need to use additional sensor technology. Instead, it is sufficient to adapt the evaluation electronics or the corresponding operating software accordingly. This provides a cost-effective way of obtaining further information about the fluid or fluid distribution network. The method can also be implemented simply, as no additional bores and/or sensors are required.

It is advantageous to tap the voltage signal waveform by continuously or discontinuously tapping voltage signals from the ultrasonic transducer. In particular, a continuous tap can be advantageous, as otherwise the voltage generated by the ultrasonic transducer could be reduced by the effect of its own internal resistance. As a result, not every pressure variation might be detected and an incorrect pressure change might be measured.

It is advantageous if the tapped voltage signals are integrated or accumulated, or if the fluid pressure values or fluid pressure change values derived from the tapped voltage values are integrated or accumulated, or if fluid pressure values or fluid pressure change values derived from the voltage signal waveform are integrated or accumulated. This allows the voltage signals or the fluid pressure values or the fluid pressure change values to be evaluated in a simple way, e.g. after a certain observation time.

By specifying an initial value representing the pressure in the fluid distribution network, a pressure and/or a pressure change in the fluid distribution network can be determined by using the tapped voltage signals and/or by using the derived pressure values or pressure change values.

Preferably, the voltage signal waveform or the voltage signals can be tapped by the evaluation electronics with high impedance. In this way the resistance applied by the tap, e.g. the input resistance of an operational amplifier, is preferably greater than the ohmic equivalent resistance of the ultrasonic transducer by at least a factor of 1,000. Ideally, the resistance applied is greater than 750 MΩ, preferably greater than 900 MΩ, particularly preferably greater than 1 GΩ.

The voltage signal(s) or voltage signal waveform tapped by the evaluation electronics can advantageously be amplified or attenuated.

The fact that the voltage signal(s) or voltage signal waveform tapped by the evaluation electronics can be filtered way that all interference signals that do not result from the hydraulic force change can be filtered out of the voltage signal or voltage signal waveform. This enables a particularly accurate method.

A measuring capacitor that has been previously charged, preferably to a predetermined voltage level, can be advantageously discharged. For this purpose, the tapped voltage signals or the tapped voltage signal waveform are fed to the measuring capacitor and this is discharged depending on the voltage signals or the voltage signal waveform. Depending on the level of the voltage signals or the level waveform of the voltage signal waveform, the measuring capacitor is discharged at different rates. The measuring capacitor is preferably disposed in an evaluation circuit that includes a semiconductor component, e.g. an n-channel MOSFET, which discharges the measuring capacitor depending on the level of the voltage signals or the level waveform of the voltage signal waveform applied to its control terminal or gate terminal. From the discharge behavior of the measuring capacitor, the hydraulic force change exerted on the ultrasonic transducer by the fluid can be deduced.

By determining the charge state of the measuring capacitor after a specified discharge time or a specified time interval, the charge states of the measuring capacitor determined after a specified discharge time or time interval are comparable with each other. After the charge state has been determined, the measuring capacitor is charged back up to the previously specified voltage level and discharged once again, e.g. with the voltage signals or the voltage signal waveform. Preferably, the specified discharge time or time interval is 20 to 40 s, preferably 25 to 35 s, particularly preferably 28 to 32 s. The long discharge times and the interval or frequency for determining the charge state resulting from the discharge times can guarantee a particularly energy-saving operation.

The charge state of the measuring capacitor is advantageously evaluated digitally, e.g. by measuring or reading out the charging voltage of the measuring capacitor using an analogue-to-digital converter. In this way a component already existing in the ultrasonic fluid meter can be used.

Alternatively, the charge state of the measuring capacitor can be evaluated in analogue form, e.g. by using an analogue circuit. In this case, the charging voltage of the measuring capacitor is reduced by a known resistance after the discharge time has expired and the time taken for the charging voltage to reduce to a defined reference value is measured. Since the time taken corresponds to the charge state of the measuring capacitor, it can be converted into the charge state of the measuring capacitor.

Advantageously, from the determined charge state of the measuring capacitor or the determined time taken for the charging voltage of the measuring capacitor to decrease to a defined reference value, a corresponding, e.g. relative, change in fluid pressure can be determined by using a characteristic map. Alternatively, the determined charge state of the measuring capacitor can also be compared with a reference charge state in order to determine a change in fluid pressure.

For example, the characteristic map can be a lookup table or a polynomial.

Advantageously, the following actions are performed based on the voltage signal waveform:
  detecting a fluid pressure change and/or
  determining a fluid pressure and/or
  detecting a leak and/or
  monitoring the fluid distribution network and/or
  regulating the activation of the pump power of the supplier for the fluid distribution network.

As a result, various characteristic values or information on the fluid or the fluid distribution network can be determined from the voltage signal waveform and/or various functions can be realized. The method is therefore suitable for many different applications. The prevailing fluid pressure can be determined, for example, by integrating or accumulating the measured fluid pressure change in conjunction with an initial value representing the pressure in the fluid distribution network, e.g. when installing the fluid meter. By monitoring the fluid distribution network, in particular, pressure shocks within the network can be detected. These cause, for example, a higher mechanical load on the fluid distribution network, which can cause the components installed in the fluid distribution network to wear more quickly. The fluid distribution network monitoring can therefore pre-emptively warn the user that individual components of the fluid distribution network must be replaced. By regulating the activation of the pump power of the supplier for the fluid distribution network, it is possible in particular to enable an energy-efficient pump operation.

Advantageously, the detection of a fluid pressure change and/or the determination of a fluid pressure and/or the detection of a leak and/or the monitoring of the fluid distribution network and/or the regulation of the activation of the pump power of the supplier for the fluid distribution network are performed by a head-end. A head-end is in particular a logic node or central data management system. The head-end can preferably be mounted on the ultrasonic fluid meter or on an external concentrator. The functions or characteristic values can be advantageously output by using a display and/or a data interface on the ultrasonic fluid meter and/or on the head-end, so that the user and/or end customer is informed of them.

With the objects of the invention in view, there is also provided an ultrasonic fluid meter, preferably an ultrasonic water meter, for installation in a fluid distribution network, comprising a measuring tube housing, at least one ultrasonic transducer for emitting and/or receiving an ultrasonic signal that travels along a measurement path, an electronic module which contains a control and evaluation electronics for controlling the operation and for evaluating the received ultrasonic signal, and a battery, the ultrasonic fluid meter being operated according to the method of the invention.

According to the invention, the ultrasonic fluid meter is operated according to the method of the invention.

Preferably, a data interface is provided on the ultrasonic fluid meter for data export.

Preferably, the ultrasonic transducer can be directly exposed to the fluid. Alternatively, a metal plate or a metal diaphragm or a plastic plate or plastic diaphragm can be provided between the ultrasonic transducer and the fluid to transmit the hydraulic force or change of force to the ultrasonic transducer. The metal or plastic diaphragm is preferably 0.1 to 0.3 mm thick.

Other features which are considered as characteristic for the invention are set forth in the appended claims.

Although the invention is illustrated and described herein as embodied in a method for operating an ultrasonic fluid meter for pressure determination using a piezoceramic ultrasonic transducer, and an ultrasonic fluid meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
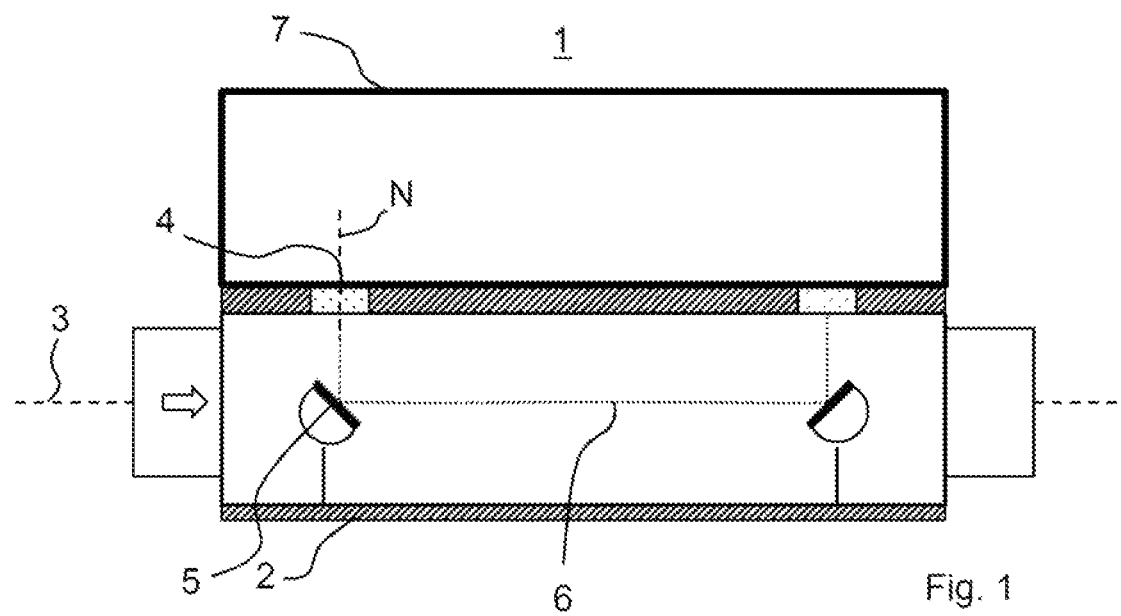
FIG. 1 is a simplified, diagrammatic, cross-sectional view of an ultrasonic fluid meter for applying the method according to the invention.

Referring now to the figures of the drawings in detail and first, particularly, to FIG. 1 thereof, there is seen an ultrasonic fluid meter 1, e.g. a water meter, which has a housing, e.g. a measuring tube housing 2, that is installed in a fluid distribution network 3, e.g. a supply pipe for cold or warm water. The ultrasonic fluid meter 1, for example, has two ultrasonic transducers 4, one of which is located closer to an inlet (see arrow in FIG. 1) than the other ultrasonic transducer. The ultrasonic transducers 4 are located, for example, in a bore in the wall of the measuring tube housing 2 and are oriented with their respective surface normal N perpendicular to the flow direction of the fluid within the measuring tube housing 2.

Each ultrasonic transducer 4 includes a piezoelectric element in the form of a piezoceramic plate, which is provided along both sides of its main surfaces with electrodes (not shown in FIG. 1) which are wired in an electronic module 7 located on the top of the measuring tube housing 2. The electronic module 7 contains control and evaluation electronics 14 for controlling the operation and for evaluating the received ultrasonic signal. The piezoceramic plate can be directly exposed to the fluid. Alternatively, a metal plate or a metal diaphragm or a plastic plate or plastic diaphragm can be provided between the piezoceramic plate and the fluid to transmit the hydraulic force or change of force to the ultrasonic transducer.

Inside the measuring tube housing 2 are two reflectors 5 which are configured to deflect an ultrasonic signal (ultrasonic burst) emitted by the ultrasonic transducer 4 in the longitudinal direction of the measuring tube housing 2 or to deflect it from the longitudinal direction of the measuring tube housing 2 back toward the receiving ultrasonic transducer. A measurement path 6 of the example of the ultrasonic fluid meter 1 shown in FIG. 1 is U-shaped. However, it can also have other shapes, such as a W-shape or double W-shape, in which more than two deflections take place or more deflection mirrors are provided, respectively. By emitting ultrasonic signals both in and opposite to the flow direction, provided that the fluid flows through the measuring tube housing 2, it is possible to deduce the flow volume on the basis of the resulting transit time and/or transit time difference of the ultrasonic signal both in the flow direction and in the opposite direction to the flow direction.

Figure 2:
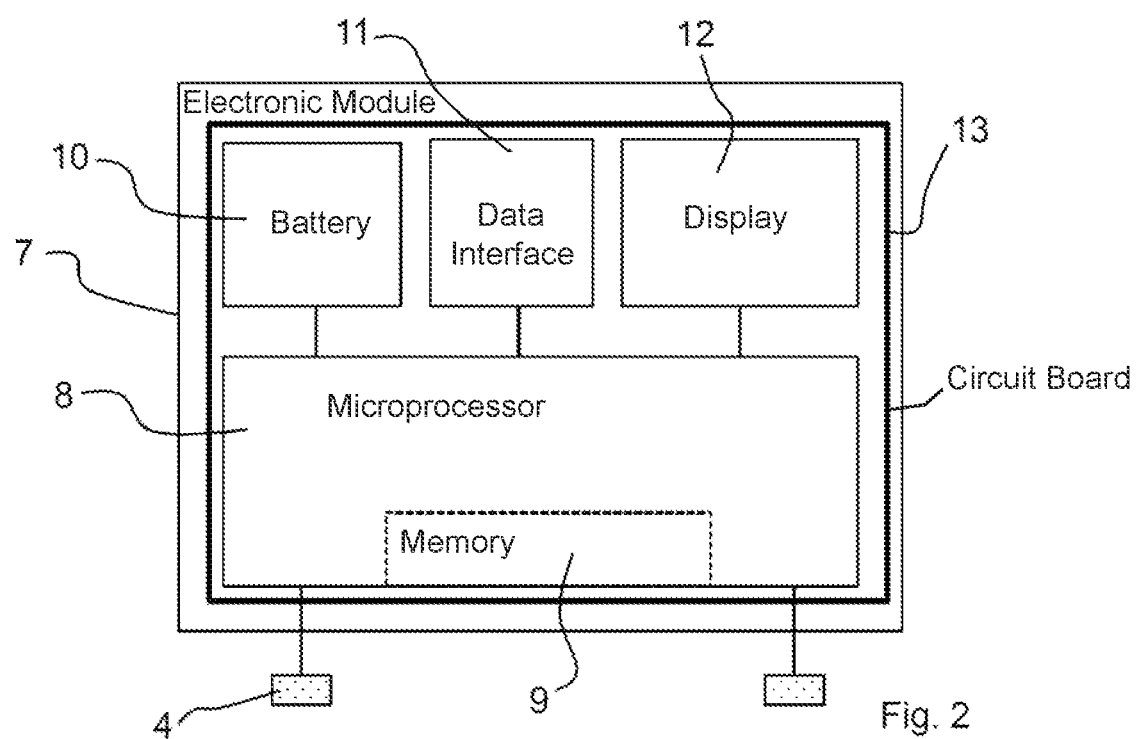
FIG. 2 is a block diagram of an example of the configuration of the electronic module of an ultrasonic fluid meter.

FIG. 2 shows the basic functional elements of the electronic module 7 of an ultrasonic fluid meter 1 in a highly simplified schematic representation. The electronic module 7 includes a circuit board 13 with a microprocessor 8 with a memory 9. A battery 10 is also provided to ensure the service life of the ultrasonic fluid meter in the field. Ultrasonic fluid meters of this kind are configured for a service life of at least 12 years, so that the battery 10 must ensure the function of the ultrasonic fluid meter 1 over this long period of time. In addition, a display 12 can be provided on the ultrasonic fluid meter 1. The data generated by the ultrasonic fluid meter 1 is output by a data interface 11. This is usually a radio interface that allows consumption data and/or other operational data to be transmitted to an external (not shown) data collector and/or to receive data sent by the data collector. The data collector can be either stationary or mobile. The data from the ultrasonic fluid meter 1 is usually forwarded from the data collector to a head-end (also not shown). The data is evaluated in the head-end.

A hydraulic force change acting on the ultrasonic transducer 4 through the fluid generates a voltage signal waveform U on the ultrasonic transducer, which, according to the invention, is tapped by the evaluation electronics 14. This hydraulic force change can be caused by a change in fluid pressure.

Figure 3:
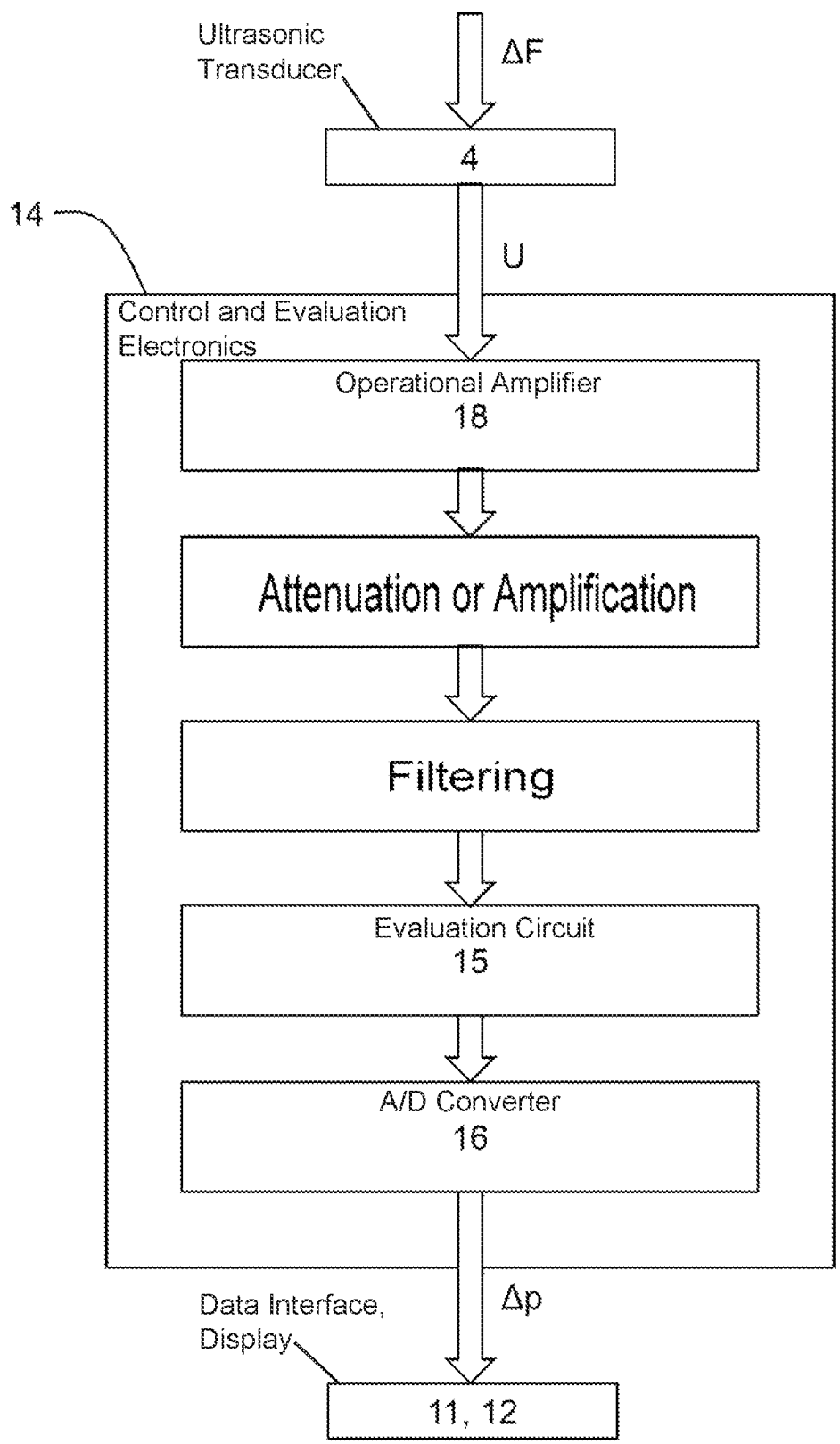
FIG. 3 is a flowchart of an exemplary method sequence with a digital evaluation to determine a change in fluid pressure.

FIG. 3 shows an exemplary method sequence for the digital evaluation of the determined voltage signal waveform U. If a force or force change ΔF acts on the ultrasonic transducer 4, this generates a voltage signal waveform U due to the piezoelectric effect. The piezoelectric effect describes the occurrence of an electrical voltage on solid bodies when they are elastically deformed. If a hydraulic force change $\Delta F_3$ acts on the piezoceramic ultrasonic transducer 4 with a piezoelectric voltage constant $g_{33}$, an electrode gap t and the surface area of the piezoceramic $A_{PZT}$, the voltage signal $U_i$ is generated. The voltage signal $U_i$ can be calculated as follows:

$$U_i = g_{33} \cdot t \cdot \frac{\Delta F_3}{A_{PZT}} \quad (1)$$

In this case, the change in fluid pressure Δp in conjunction with the surface area of the piezoceramic $A_{PZT}$ can be converted into the effective hydraulic force change $\Delta F_3$:

$$\Delta F_3 = \Delta p \cdot A_{PZT} \quad (2)$$

The present invention uses these properties, which are already present in every piezoceramic ultrasonic transducer 4 and consequently in every ultrasonic fluid meter 1. In this way additional sensors are no longer necessary, and the method is therefore particularly simple to implement and cost-effective.

As FIG. 3 also shows, the voltage signal waveform U generated by the hydraulic force change at the ultrasonic transducer 4 is tapped, e.g. by using an operational amplifier 18 of the evaluation electronics 14, preferably with high impedance. The voltage signal waveform U can be tapped by tapping the voltage signals $U_i$ continuously. After tapping, the voltage signals $U_i$ or the voltage signal waveform U are/is attenuated or amplified. The voltage signals $U_i$ or the voltage signal waveform U are/is then filtered to remove interference signals. The pre-processing of the voltage signal waveform U is thereby complete.

Figure 4:
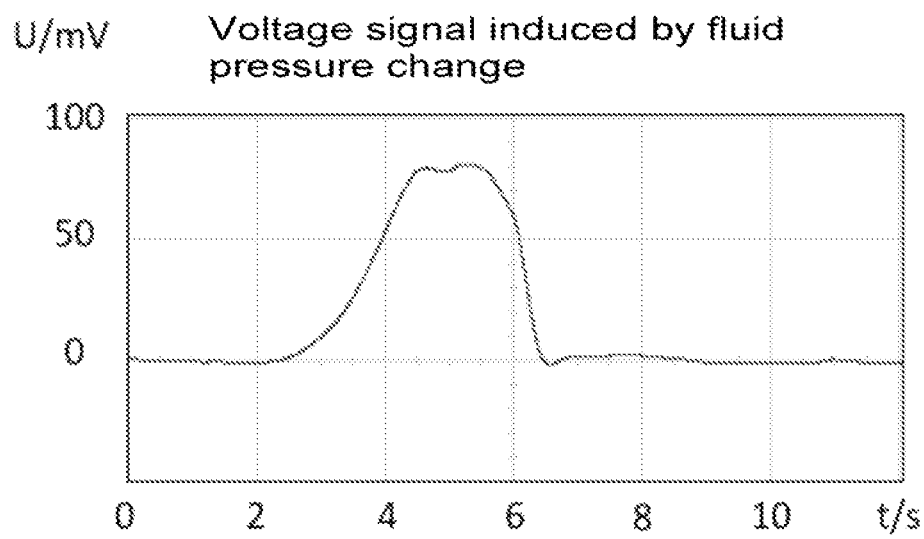
FIG. 4 is an example of a voltage/time diagram to illustrate a voltage signal induced by a change in fluid pressure.

FIG. 4 shows an exemplary voltage signal waveform U in mV induced on the ultrasonic transducer 4 as a function of the time t in s after the signal has been pre-processed. Due to an increase in fluid pressure, a hydraulic force change is exerted on the ultrasonic transducer 4, causing the voltage of the voltage signal waveform U to rise significantly. As soon as a constant or static fluid pressure is present in the fluid distribution network, the voltage generated on the ultrasonic transducer 4 is automatically reduced by its internal resistances. The voltage signal waveform U therefore drops and reaches the voltage value 0 V. A swing of the voltage signal waveform U thus only represents a relative change in fluid pressure. If the voltage of the voltage signal waveform is 0 V, this means that a static fluid pressure is present. Due to a fluid pressure reduction, the voltage signal can also drop and assume negative values.

Figure 5:
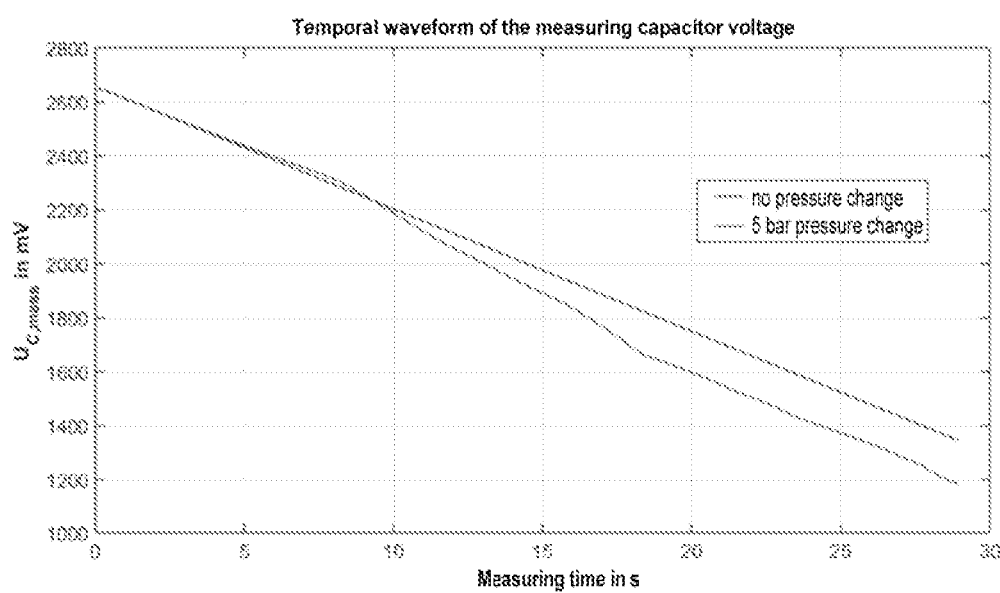
FIG. 5 is an example of a voltage/time diagram of a measuring capacitor voltage to illustrate the discharge process of a measuring capacitor by using various voltage signals.

The voltage signal waveform U is then evaluated and fed to an evaluation circuit 15 for this purpose, see FIG. 3. The evaluation circuit 15 includes a semiconductor device, e.g. an n-channel MOSFET, which discharges a measuring capacitor, preferably charged to a known voltage level, depending on the level waveform or voltage of the voltage signal waveform U applied to its control terminal or gate terminal. Depending on the level waveform or the voltage of the voltage signal waveform U, the measuring capacitor is discharged at different rates over a measurement time in s, e.g. 30 s, as shown in FIG. 5. On one hand FIG. 5 shows the waveform of the charge state $U_{C,mess}$ in mV of the measuring capacitor against measurement time, the measuring capacitor being discharged with a voltage signal waveform based on no change in fluid pressure. The figure also shows the waveform of the charge state $U_{C,mess}$ of a measuring capacitor over time, which is discharged over the measurement time with a voltage signal waveform based on a linear relative fluid pressure increase of 5 bar. It is shown that the measuring capacitor is discharged at a higher rate by the voltage signal waveform.

After a specified discharge time, the charge state of the measuring capacitor is evaluated digitally and read out using an analogue-to-digital converter 16 for this purpose. The measured charge state is converted into a corresponding change in fluid pressure Δp using a characteristic map, preferably a lookup table or a polynomial. After the readout, the measuring capacitor is charged back up to the known voltage level and then discharged again.

Figure 6:
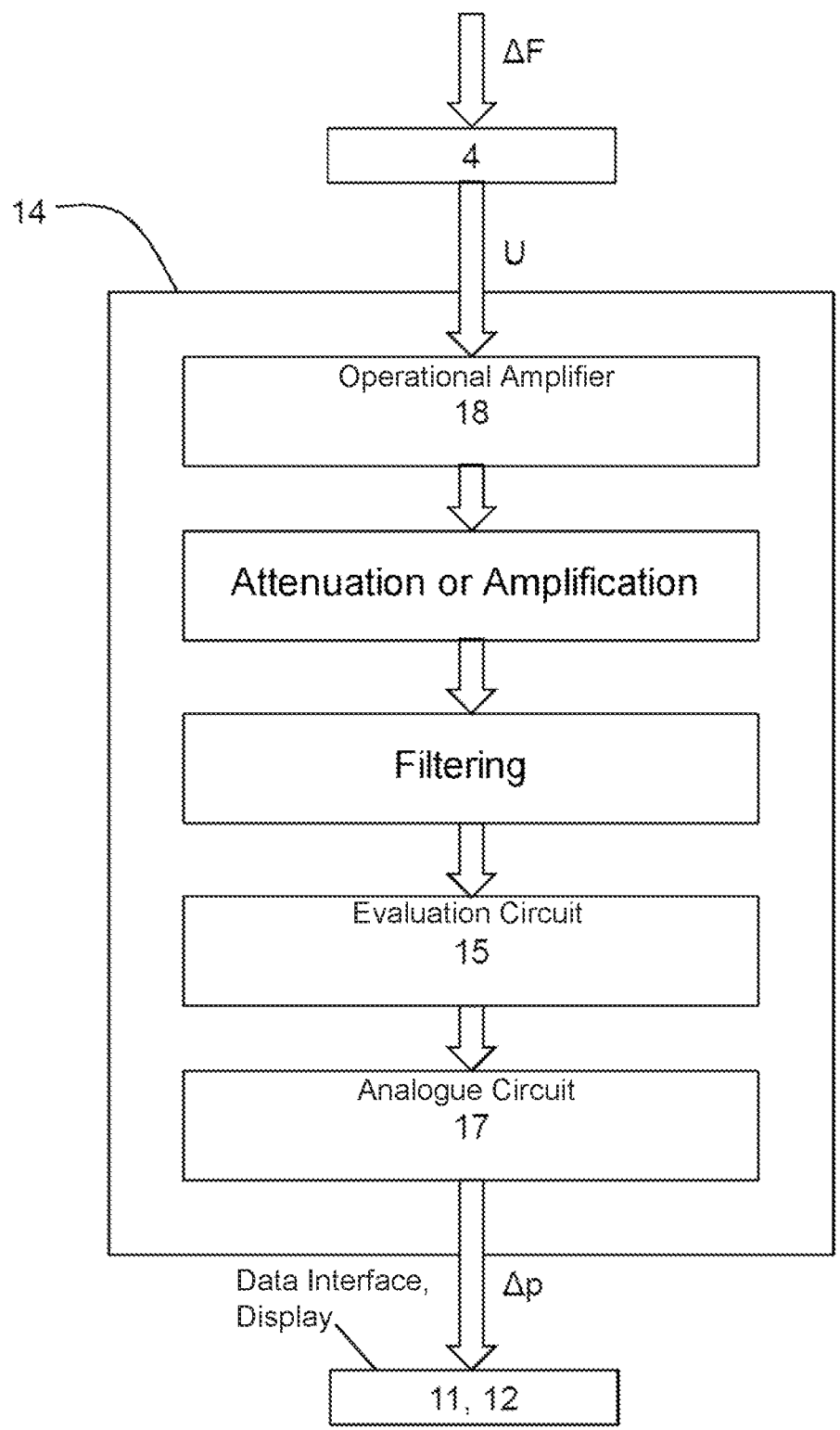
FIG. 6 is a flowchart of an exemplary method sequence with an analogue evaluation to determine a change in fluid pressure.

*As an alternative to the digital evaluation, the charge state of the measuring capacitor can also be evaluated in analogue form by an analogue circuit 17, see FIG. 6. In this case, a voltage signal waveform U is tapped as in the digital evaluation and a measuring capacitor is thus discharged. The charging voltage of the measuring capacitor is reduced by a known resistor and the time required for the discharge process is measured. The measured duration is therefore related to the charging voltage of the measuring capacitor. The measured duration can be converted into a corresponding fluid pressure change Δp using a characteristic map. Alternatively, the charging voltage of the measuring capacitor can first be calculated using the duration and the latter can then be converted into a corresponding fluid pressure change Δp using a characteristic map. As in the analogue evaluation, the characteristic map can be a lookup table or a polynomial.

In addition, the static fluid pressure present in the fluid distribution network can be determined based on the voltage signal waveform U. The prevailing static fluid pressure can be determined by integrating or accumulating the voltage signal waveform U, or integrating or accumulating the tapped voltage signals, or integrating or accumulating fluid pressure values or fluid pressure change values derived from the voltage signal waveform in conjunction with a known initial value representing the pressure in the fluid distribution network 3, which was determined when the ultrasonic fluid meter 1 was installed, for example. In addition, leakage detection and/or monitoring of the fluid distribution network 3 and/or regulation of the activation of the pump power of the supplier for the fluid distribution network 3 can be implemented. Therefore, based on the voltage signal waveform U, various characteristic values can be determined or different functions implemented. The determination of the characteristic values or the implementation of the functions is advantageously performed in a head-end. These characteristic values or functions can be provided to the user by the display 12 or exported by the data interface 11.

The method according to the invention enables a change in fluid pressure to be detected using the sensor system already present in the ultrasonic fluid meter 1. As no additional sensors need to be used, this method is particularly simple to implement. In addition, the method can be implemented in a simple and cost-effective way, as only the evaluation electronics 14 or the corresponding operating software need to be adapted accordingly.

It is explicitly pointed out that the combination of individual features and sub-features must also be regarded as important to the invention and included in the disclosed content of the application.

The following is a summary list of reference numerals and the corresponding structure used in the above description of the invention:
1 ultrasonic fluid meter
2 measuring tube housing
3 fluid distribution network
4 ultrasonic transducer
5 reflector
6 measurement path
7 electronics module
8 microprocessor
9 memory
10 battery
11 data interface
12 display
13 circuit board
14 evaluation electronics
15 evaluation circuit
16 analogue-to-digital converter
17 analogue circuit
18 operational amplifier
ΔF change in force
U voltage signal waveform
$U_i$ voltage signal
Δp fluid pressure change

The invention claimed is:

1. A method for operating an ultrasonic fluid meter or an ultrasonic water meter in a fluid distribution network, the method comprising:
using an ultrasonic transducer to generate an ultrasonic signal passing through a measurement path;
using evaluation electronics to determine a flow volume based on at least one of a transit time or a transit time difference of the ultrasonic signal;
using a hydraulic force change being caused by a fluid pressure and acting on the ultrasonic transducer through the fluid to generate a voltage signal waveform at the ultrasonic transducer, the voltage signal waveform having a voltage being dependent on a strength and a duration of action of the hydraulic force change;
using the evaluation electronics to tap the voltage signal waveform; and
deriving a fluid pressure change based on the voltage of the voltage signal waveform.

2. The method according to claim 1, which further comprises tapping the voltage signal waveform by continuously or discontinuously tapping voltage signals.

3. The method according to claim 1, which further comprises:
integrating or accumulating the tapped voltage signals, or
integrating or accumulating fluid pressure values or fluid pressure change values derived from the tapped voltage values, or
integrating or accumulating fluid pressure values or fluid pressure change values derived from the voltage signal waveform.

4. The method according to claim 1, which further comprises specifying an initial value representing a pressure in the fluid distribution network.

5. The method according to claim 1, which further comprises using the evaluation electronics to tap the voltage signal waveform with high impedance.

6. The method according to claim 1, which further comprises amplifying or attenuating the voltage signals or the voltage signal waveform.

7. The method according to claim 1, which further comprises filtering the voltage signals or the voltage signal waveform.

8. The method according to claim 1, which further comprises discharging a previously-charged measuring capacitor.

9. The method according to claim 8, which further comprises discharging the previously-charged measuring capacitor to a predetermined voltage level.

10. The method according to claim 8, which further comprises determining a charge state of the measuring capacitor in each case after a specified discharge time.

11. The method according to claim 10, which further comprises digitally evaluating the charge state of the measuring capacitor.

12. The method according to claim 10, which further comprises evaluating the charge state of the measuring capacitor in analogue form.

13. The method according to claim 10, which further comprises using a characteristic map to determine a corresponding fluid pressure change from the determined charge state of the measuring capacitor.

14. The method according to claim 13, which further comprises providing a lookup table or a polynomial as the characteristic map.

15. The method according to claim 1, which further comprises, based on the voltage signal waveform, at least one of:
determining a fluid pressure, or
detecting a leak, or
monitoring the fluid distribution network, or
regulating an activation of a pump power of a supplier for the fluid distribution network.

16. The method according to claim 15, which further comprises using a head-end to carry out at least one of:
the detection of a fluid pressure change, or
the determination of a fluid pressure, or
the detection of a leak, or
the monitoring of the fluid distribution network, or
the regulation of the activation of the pump power of the supplier for the fluid distribution network.

17. An ultrasonic fluid meter or ultrasonic water meter for installation in a fluid distribution network, the ultrasonic fluid meter comprising:
a measuring tube housing;
at least one ultrasonic transducer for at least one of emitting or receiving an ultrasonic signal traveling along a measurement path;
an electronic module containing control and evaluation electronics for controlling operation and evaluating a received ultrasonic signal; and
a battery;
the ultrasonic fluid meter being operated according to the method of claim 1.

18. The ultrasonic fluid meter according to claim 17, which further comprises a data interface provided for data export.

* * * * *